United States Patent
Trinh

(10) Patent No.: US 11,703,124 B2
(45) Date of Patent: Jul. 18, 2023

(54) ACTUATOR SYSTEM FOR A VEHICLE TRANSMISSION, A VEHICLE COMPRISING AN ACTUATOR SYSTEM, AND A METHOD FOR OPERATING AN ACTUATOR SYSTEM

(71) Applicants: Ningbo Geely Automobile Research & Development Co., Ltd., Ningbo (CN); Zhejiang Geely Holding Group Co., Ltd., Zhejiang (CN)

(72) Inventor: Freddy Trinh, Gothenburg (SE)

(73) Assignee: NINGBO GEELY AUTOMOBILE RESEARCH & DEVELOPMENT CO., Ningbo (CN)

( * ) Notice: Subject to any disclaimer, the term of this patent is extended or adjusted under 35 U.S.C. 154(b) by 0 days.

(21) Appl. No.: 17/831,654

(22) Filed: Jun. 3, 2022

(65) Prior Publication Data

US 2022/0290755 A1    Sep. 15, 2022

Related U.S. Application Data

(63) Continuation of application No. PCT/CN2020/129767, filed on Nov. 18, 2020.

(30) Foreign Application Priority Data

Dec. 9, 2019 (EP) .................................... 19214478

(51) Int. Cl.
*F16H 63/00* (2006.01)
*F16H 63/30* (2006.01)
(Continued)

(52) U.S. Cl.
CPC ..... *F16H 63/3043* (2013.01); *F16H 57/0436* (2013.01); *F16H 57/0446* (2013.01);
(Continued)

(58) Field of Classification Search
CPC ............ F16H 63/3043; F16H 57/0436; F16H 57/0446; F16H 61/32; F16H 63/32;
(Continued)

(56) References Cited

U.S. PATENT DOCUMENTS 3,161,015 A    12/1964   Knowles
5,460,060 A *  10/1995   Nellums ............... F16H 63/304
                                                            192/84.1
(Continued)

FOREIGN PATENT DOCUMENTS

CN    101131199 A    2/2008
CN    101445110 A    6/2009
(Continued)

OTHER PUBLICATIONS

International Search Report from corresponding International Application No. PCT/CN2020/129767, dated Feb. 20, 2021, 3 pages.

*Primary Examiner* — Victor L Macarthur
(74) *Attorney, Agent, or Firm* — Tucker Ellis LLP

(57) ABSTRACT

An actuator system for a vehicle transmission includes an actuating unit and an electric motor drivingly connected to the actuating unit. The actuating unit is configured for displacement by the electric motor between an engagement mode where the transmission is connected to a propulsion unit and a disengagement mode where the transmission is disconnected from the propulsion unit. A clutch unit between the actuating unit and the electric motor is connected to a drive shaft of the electric motor. The clutch unit is configured for connecting the actuating unit to the electric motor when displacing the actuating unit between the engagement disengagement modes. The clutch unit disconnects the actuating unit from the electric motor in the
(Continued)

engagement mode. The system further includes an oil pump unit driven by the electric motor at least in the engagement mode.

6 Claims, 3 Drawing Sheets

(51) Int. Cl.
*F16H 57/04* (2010.01)
*F16H 61/32* (2006.01)
*F16H 63/32* (2006.01)
*F16H 61/28* (2006.01)

(52) U.S. Cl.
CPC ............ *F16H 61/32* (2013.01); *F16H 63/32* (2013.01); *F16H 2061/2884* (2013.01); *F16H 2063/3063* (2013.01)

(58) Field of Classification Search
CPC ..... F16H 2061/2884; F16H 2063/3063; F16H 63/304; F16H 63/04; F16H 2063/3089; F16H 25/20
See application file for complete search history.

(56) References Cited

U.S. PATENT DOCUMENTS

| | | | |
|---|---|---|---|
| 5,517,876 A * | 5/1996 | Genise | ................. F16H 63/304 |
| | | | 192/109 A |
| 7,231,765 B2 | 6/2007 | Kawamura | |
| 10,309,522 B2 | 6/2019 | Palazzolo | |
| 11,054,029 B2 * | 7/2021 | Cho | ................... F16H 63/3466 |
| 2004/0254040 A1 | 12/2004 | Somschor | |
| 2011/0129356 A1 | 6/2011 | Kobayashi | |
| 2011/0303049 A1 | 12/2011 | Neelakantan | |
| 2017/0211699 A1 | 7/2017 | Sasanuma | |
| 2020/0370646 A1 * | 11/2020 | Trinh | ...................... F16H 25/20 |
| 2021/0215237 A1 * | 7/2021 | Wei | ......................... F16H 63/00 |

FOREIGN PATENT DOCUMENTS

| | | |
|---|---|---|
| CN | 203384353 U | 1/2014 |
| CN | 104718393 A | 6/2015 |
| CN | 205423707 U | 8/2016 |
| CN | 110382272 A | 10/2019 |
| DE | 102012003415 A1 | 8/2013 |
| DE | 102017130920 A1 | 6/2019 |
| EP | 1541904 A1 | 6/2005 |
| EP | 3530994 A1 | 8/2019 |
| FR | 3011055 A1 | 3/2015 |

* cited by examiner

US 11,703,124 B2

ACTUATOR SYSTEM FOR A VEHICLE TRANSMISSION, A VEHICLE COMPRISING AN ACTUATOR SYSTEM, AND A METHOD FOR OPERATING AN ACTUATOR SYSTEM

RELATED APPLICATION DATA

This application is a continuation of International Patent Application No. PCT/CN2020/129767, filed Nov. 18, 2020, which claims the benefit of European Patent Application No. 19214478.0, filed Dec. 9, 2019, the disclosures of which are incorporated herein by reference in their entireties.

TECHNICAL FIELD

The present disclosure relates to an actuator system for a vehicle transmission. The system comprises an actuating unit and an electric motor drivingly connected to the actuating unit. The actuating unit is configured for being displaced by the electric motor between an engagement mode where the transmission is connected to a propulsion unit, and a disengagement mode where the transmission is disconnected from the propulsion unit. The disclosure further relates to a vehicle comprising an actuator system, and a method for operating an actuator system.

BACKGROUND

Actuator systems are commonly used in vehicle transmissions when there is a need for shifting transmission operational modes, such as for example between an engagement mode where the transmission is connected to a propulsion unit, and a disengagement mode where the transmission is disconnected from the propulsion unit. The actuator systems often comprise an actuating unit and an electric motor drivingly connected to the actuating unit. The actuating unit is being displaced by the electric motor between the operational modes. Actuator systems of the type described are often expensive, and many times only used during the shifting between the operational modes. The investment costs of the parts involved are thus high compared to the utilization of the parts. Therefore, the efficiency of the actuator system in terms of utilization vs. investment cost is low. Further, there is a desire to reduce the number of components in the vehicle construction to avoid unnecessary costs and complex solutions.

There is thus a need for an improved actuator system having increased efficiency, reduced cost, and reduced number of components.

SUMMARY

An object of the present disclosure is to provide an actuator system for a vehicle transmission, a vehicle comprising an actuator system, and a method for operating an actuator system, where the previously mentioned problems are avoided. This object is at least partly achieved by the features of the independent claims. The dependent claims contain further developments of the actuator system and the method for operating an actuator system.

The disclosure concerns an actuator system for a vehicle transmission. The system comprises an actuating unit and an electric motor drivingly connected to the actuating unit. The actuating unit is configured for being displaced by the electric motor between an engagement mode where the transmission is connected to a propulsion unit, and a disengagement mode where the transmission is disconnected from the propulsion unit. The system further comprises a clutch unit arranged between the actuating unit and the electric motor and connected to a drive shaft of the electric motor. The clutch unit is configured for connecting the actuating unit to the electric motor when displacing the actuating unit between the engagement mode and the disengagement mode. The clutch unit is configured for disconnecting the actuating unit from the electric motor in the engagement mode. The system further comprises an oil pump unit drivingly connected to the electric motor, and the electric motor is configured for driving the oil pump unit at least in the engagement mode.

Advantages with these features are that the actuator system through the integration of the oil pump and the clutch unit in the system, the electric motor arranged for driving the actuating unit also is used for driving the oil pump in at least the engagement mode. Therefore, the actuating unit and oil pump can be operated with the same electric motor, wherein the number of components in the vehicle construction can be reduced to avoid unnecessary costs and complex solutions. The efficiency of the actuator system in terms of utilization vs. investment cost is increased with the system, since the electric motor not only is used when operating the actuator, but also when driving the oil pump. The actuator system with the combined use of the electric motor is having increased efficiency, reduced cost, and reduced number of components.

According to an aspect of the disclosure, the oil pump unit is arranged between the electric motor and the clutch unit. The drive shaft of the electric motor is connected to a pump rotor of the oil pump unit. With the configuration where the oil pump unit is arranged between the electric motor and the clutch unit, a compact actuator system can be achieved. The connection between the drive shaft and the pump rotor can be made with a compact design, since the components involved can be placed in connection to each other. Traditional transmission configurations are often locating the oil pump unit in a position apart from the actuator, with the need for a separate electric motor to drive the oil pump unit.

According to another aspect of the disclosure, the oil pump unit comprises a housing structure encompassing the pump rotor, where the housing structure is arranged in connection to the clutch unit. The arrangement of the housing structure in connection to the clutch unit is further providing a compact design of the system.

According to an aspect of the disclosure, the clutch unit comprises an input section and an output section. The input section is connected to the drive shaft of the electric motor and the output section is connected to the actuating unit. The input section is configured for being connected to the output section when displacing the actuating unit between the engagement mode and the disengagement mode. The input section is configured for being disconnected from the output section in the engagement mode. With this configuration, the clutch unit can operate in the different modes.

According to another aspect of the disclosure, the clutch unit further comprises a locking mechanism. The locking mechanism is configured for connecting the input section to the output section when the actuating unit is exerting a rotational force equal to or less than a predetermined force level value during displacement of the actuating unit between the engagement mode and the disengagement mode on the output section. The locking mechanism is configured for disconnecting the input section from the output section when the actuating unit is exerting a rotational force greater than the predetermined force level value in the engagement mode on the output section. The locking mechanism is thus providing an efficient functionality of the clutch unit, where the predetermined force level value may differ between different system designs and transmission designs. The rotational force greater than the predetermined force level value may for example occur when the actuating unit has reached an end position.

According to an aspect of the disclosure, the locking mechanism is a detent locking mechanism comprising a spring and a detent device connected to the spring. The detent locking mechanism is providing a simple and efficient construction of the clutch unit.

According to another aspect of the disclosure, the actuating unit comprises an actuating mechanism and a shifting unit. The actuating mechanism is configured for displacing the shifting unit between an engagement position and a disengagement position. The actuating unit is in the engagement mode configured for positioning the shifting unit in the engagement position. The actuating unit is in the disengagement mode configured for positioning the shifting unit in the disengagement position.

According to a further aspect of the disclosure, the shifting unit comprises a shifting fork. The shifting fork is configured for connecting the propulsion unit to the transmission in the engagement mode and disconnecting the propulsion unit from the transmission in the disengagement mode.

According to an aspect of the disclosure, the actuating mechanism comprises a ballscrew, and the shifting unit comprises a ballscrew nut. The ballscrew is drivingly connected to the electric motor, and the ballscrew is configured for displacing the ballscrew nut between the engagement position and the disengagement position. The ballscrew and ballscrew nut combination is providing a simple and reliable construction of the actuating mechanism that can be positioned with high precision.

The disclosure further concerns a vehicle comprising an actuator system according to the above disclosure.

The disclosure further concerns a method for operating an actuator system for a vehicle transmission. The system comprises an actuating unit, an electric motor drivingly connected to the actuating unit, a clutch unit arranged between the actuating unit and the electric motor and connected to a drive shaft of the electric motor, and an oil pump unit drivingly connected to the electric motor. The method comprises the steps: connecting the actuating unit to the electric motor with the clutch unit in a disengagement mode where the transmission is disconnected from a propulsion unit; displacing the actuating unit with the electric motor from the disengagement mode to an engagement mode where the transmission is connected to the propulsion unit; disconnecting the actuating unit from the electric motor with the clutch unit in the engagement mode; and driving the oil pump unit with the electric motor in the engagement mode; and/or the method comprises the steps: connecting the actuating unit to the electric motor with the clutch unit in the engagement mode; displacing the actuating unit with the electric motor from the engagement mode to the disengagement mode. The method is providing an efficient operation of the actuator system, where the integration of the oil pump and the clutch unit in the system is securing an efficient use of the electric motor in terms of utilization vs. investment cost. The efficiency of the actuator system is increased with the method, since the electric motor not only is used when operating the actuator, but also when driving the oil pump.

According to an aspect of the disclosure, the method further comprises the steps: driving the electric motor in a first rotational direction when displacing the actuating unit from the disengagement mode to the engagement mode; and driving the electric motor in the first rotational direction in the engagement mode; and/or the method further comprises the step: driving the electric motor in a second rotational direction when displacing the actuating unit from the engagement mode to the disengagement mode. The second rotational direction is opposite the first rotational direction. The different rotational movements are providing an efficient way to operate the system between the different modes.

According to another aspect of the disclosure, the clutch unit comprises an input section and an output section. The input section is connected to the drive shaft of the electric motor and the output section is connected to the actuating unit. The method further comprises the steps: connecting the input section to the output section when displacing the actuating unit from the disengagement mode to the engagement mode; and disconnecting the input section from the output section in the engagement mode; and/or the method further comprises the step: connecting the input section to the output section when displacing the actuating unit from the engagement mode to the disengagement mode.

According to a further aspect of the disclosure, the clutch unit further comprises a locking mechanism. The method further comprises the steps: connecting the input section to the output section with the locking mechanism when the actuating unit is exerting a rotational force equal to or less than a predetermined force level value, during displacement of the actuating unit from the disengagement mode to the engagement mode, on the output section; and disconnecting the input section from the output section with the locking mechanism when the actuating unit is exerting a rotational force greater than the predetermined force level value, in the engagement mode, on the output section; and/or the method further comprises the step: connecting the input section to the output section with the locking mechanism when the actuating unit is exerting a rotational force equal to or less than a predetermined force level value, during displacement of the actuating unit from the engagement mode to the disengagement mode, on the output section. The predetermined force level value is used for controlling the functionality of the clutch unit in a simple, reliable and efficient way.

According to an aspect of the disclosure, the actuating unit comprises an actuating mechanism and a shifting unit. The method further comprises the step: displacing the shifting unit with the actuating mechanism from a disengagement position to an engagement position during displacement of the actuating unit from the disengagement mode to the engagement mode; and/or the method further comprises the step: displacing the shifting unit with the actuating mechanism from an engagement position to a disengagement position during displacement of the actuating unit from the engagement mode to the disengagement mode. The displacement of the shifting unit with the actuating mechanism is securing an efficient operation of the system between the different modes.

BRIEF DESCRIPTION OF THE DRAWINGS

The disclosure will be described in detail in the following, with reference to the attached drawings, in which.

DETAILED DESCRIPTION

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

Figure 1A:
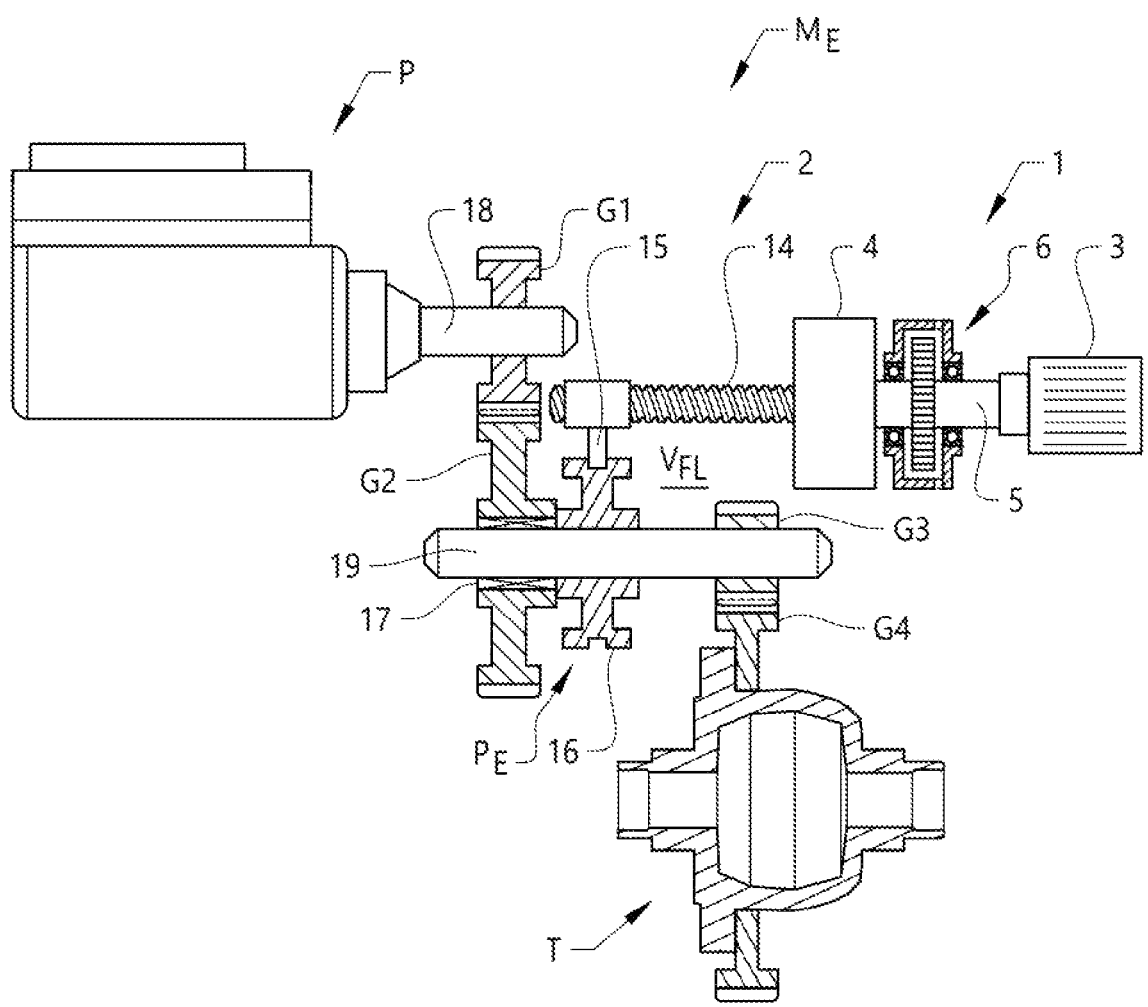
FIGS. 1A-1B show schematically, system layout views of an actuator system for a vehicle transmission in an engagement mode and a disengagement mode according to the disclosure.
Figure 1B:
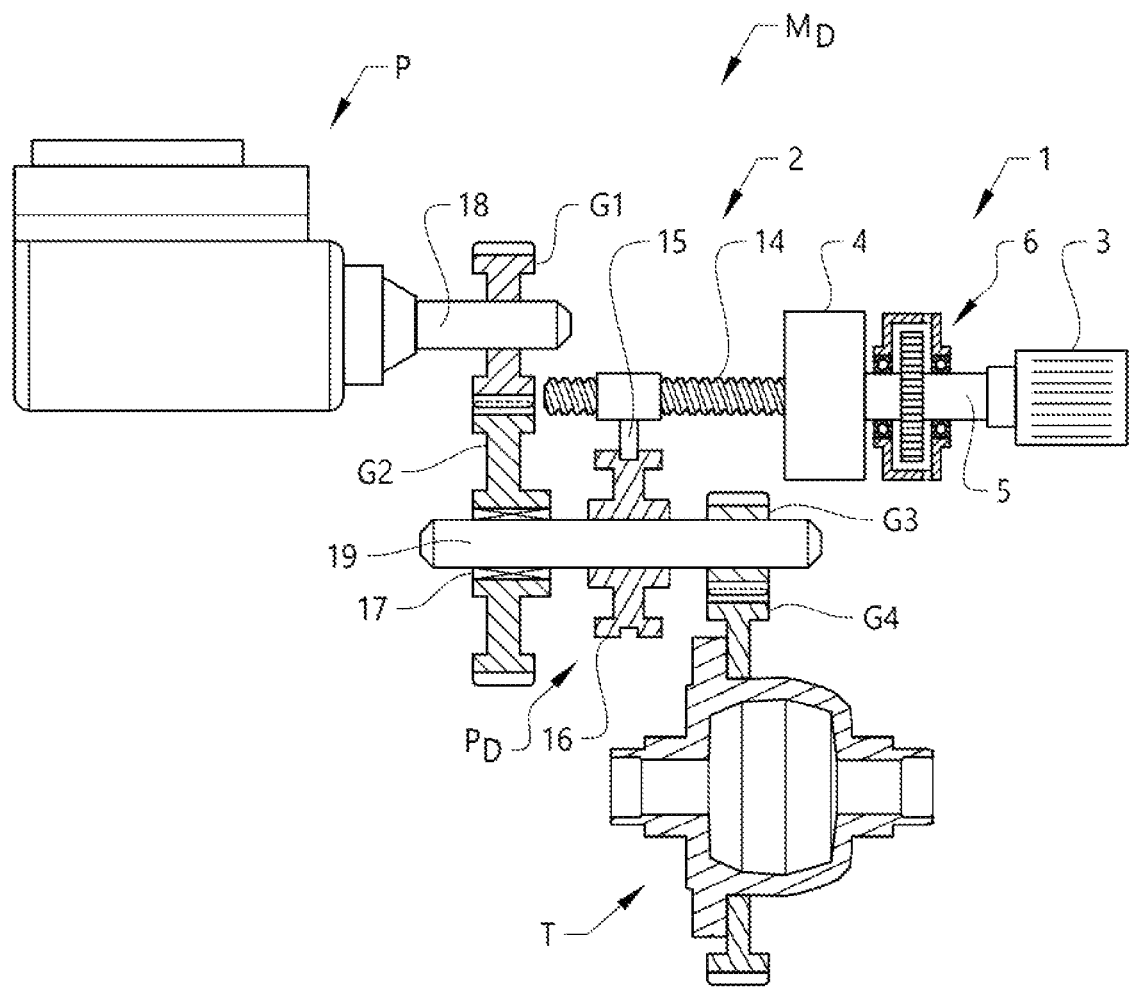

FIGS. 1A-1B schematically show an actuator system 1 for a vehicle transmission T. The transmission T may be any suitable type of vehicle transmission, where the transmission can be operated in two or more operational modes with the actuator system 1. The actuator system 1, shown more in detail in FIG. 2, comprises an actuating unit 2, an electric motor 3, a clutch unit 4, and an oil pump unit 6. In the illustrated embodiment, the transmission T is connectable to a propulsion unit P. The propulsion unit P may be of any suitable type for propelling the vehicle, such as for example an electric motor or an internal combustion engine.

The actuator system 1 may further comprise a suitable control unit for controlling the actuating functions of the actuator system 1 and other functions of the vehicle related to the actuator system 1. The control unit may comprise one or more processors and one or more memories coupled to the one or more processors for controlling the actuator system 1.

The electric motor 3 is drivingly connected to the actuating unit 2, and the actuating unit 2 is configured for being displaced by the electric motor 3 between an engagement mode $_{M_E}$ where the transmission T is connected to the propulsion unit P and a disengagement mode $M_D$ where the transmission T is disconnected from the propulsion unit P. The engagement mode $M_E$ where the transmission T is connected to the propulsion unit P is illustrated in FIG. 1A. The disengagement mode $M_D$ where the transmission T is disconnected from the propulsion unit P is illustrated in FIG. 1B. The electric motor 3 is thus driving the actuating unit 2 between the engagement and disengagement modes. The electric motor 3 may be of any suitable type, such as for example traditional DC or AC motors, a step motor or other type of electric motors.

Figure 2:
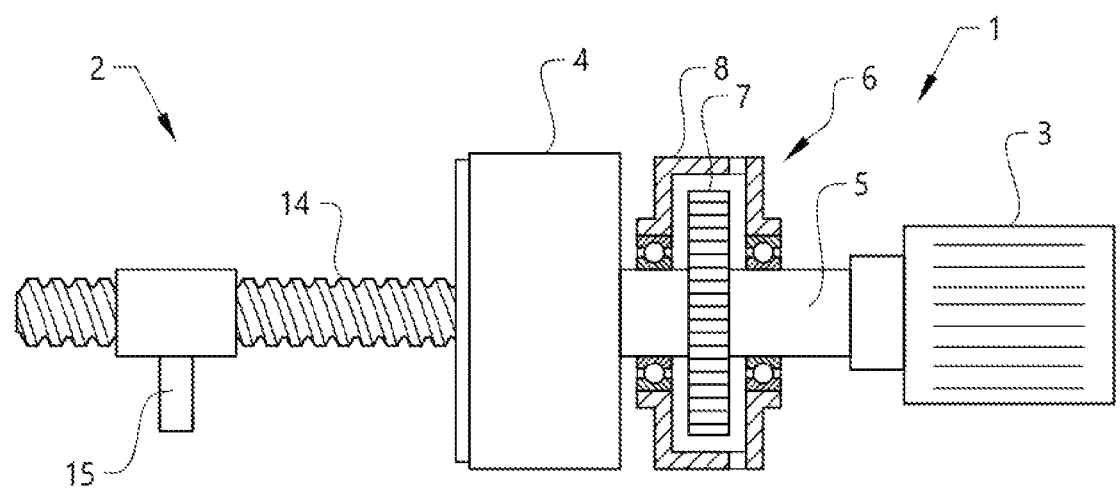
FIG. 2 shows schematically, a side view of an actuating unit according to the disclosure.

As illustrated in FIGS. 1A-1B and 2, the clutch unit 4 is arranged between the actuating unit 2 and the electric motor 3. The clutch unit 4 is connected to a drive shaft 5 of the electric motor 3, and the drive shaft 5 is transferring a rotational movement from the electric motor 3 to the clutch unit 4. The clutch unit 4 is configured for connecting the actuating unit 2 to the electric motor 3 when displacing the actuating unit 2 from the engagement mode $M_E$ to the disengagement mode $M_D$, and when displacing the actuating unit 2 from the disengagement mode $M_D$ to the engagement mode $M_E$. The clutch unit 4 is further configured for disconnecting the actuating unit 2 from the electric motor 3 in the engagement mode $M_E$, as will be described more in detail below.

Figure 3:
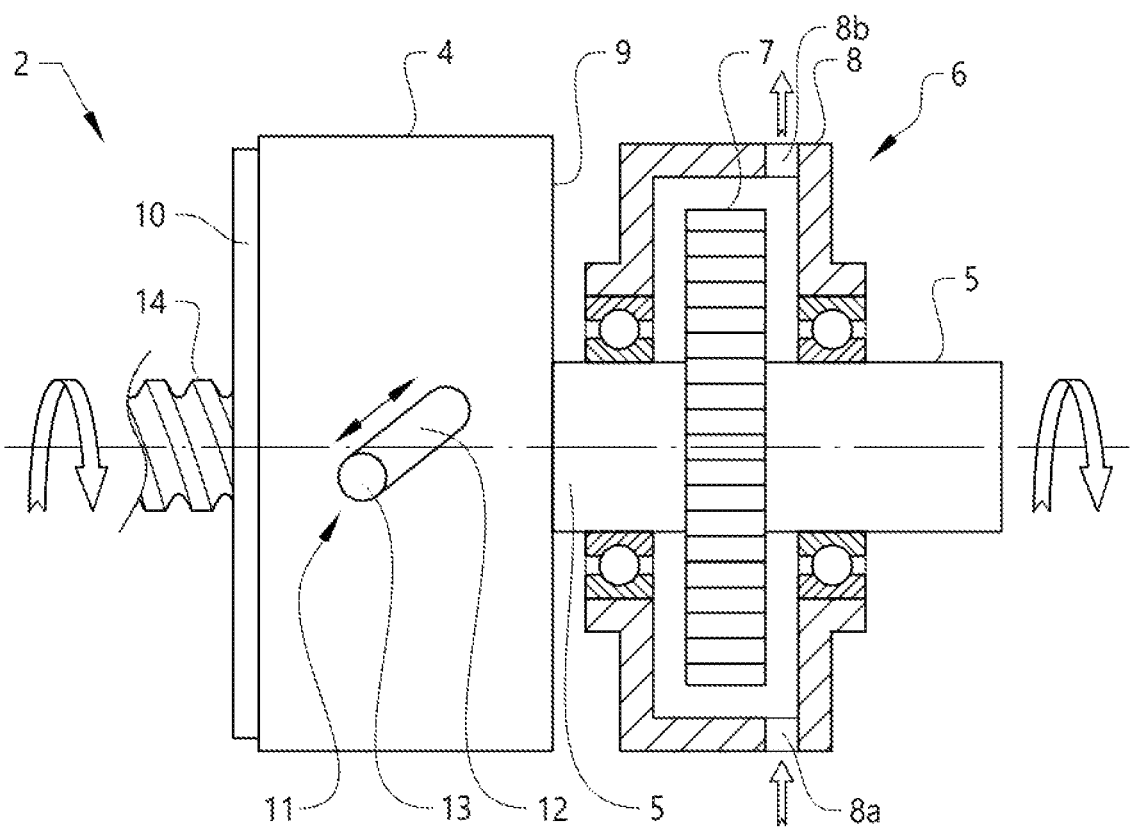
FIG. 3 shows schematically, a side view of a clutch unit and an oil pump unit according to the disclosure.

The system 1 further comprises the oil pump unit 6, as described above and illustrated in the figures. The oil pump unit 6 comprises a pump rotor 7 for pumping oil for example to the transmission T for lubricating and/or cooling purposes. The oil pump unit 6 may be used for cooling and/or lubricating other parts or components of the vehicle system. As illustrated FIGS. 2 and 3, the oil pump unit 6 is drivingly connected to the electric motor 3 via the drive shaft 5, and the electric motor 3 is arranged for driving the oil pump unit 6. The pump rotor 7 is connected to the drive shaft 5 of the electric motor 3, and the electric motor 3 is providing a rotational movement to the pump rotor 7. As shown in FIG. 3, the oil pump unit 7 comprises a housing structure 8 encompassing the pump rotor 7. The housing structure 8 may be arranged with an inlet opening 8a and an outlet opening 8b for oil flowing through the oil pump unit 6 within the housing structure 8. Suitable pipes, hoses, or other oil transportation means may be connected to the inlet opening 8a and the outlet opening 8b for the transportation of oil into and out from the oil pump unit 6.

The oil pump unit 6 is arranged between the electric motor 3 and the clutch unit 4, as shown in FIGS. 1A-1B and 2. The drive shaft 5 of the electric motor 3 is thus connected to the pump rotor 7 of the oil pump unit 6, and to the actuating unit 2 via the clutch unit 4. The housing structure 8 of the oil pump unit 6 is arranged in connection to the clutch unit 4 for a compact design of the actuator system 1. As described above, the electric motor 3 is driving the actuating unit 2 via the drive shaft 5 and the clutch unit 4 between the engagement mode $M_E$ and the disengagement mode $M_D$. In the engagement mode $M_E$, the actuating unit is arranged in an engagement position $P_E$, as schematically illustrated in FIG. 1A, where torque can be transferred from the propulsion unit P to the transmission T. A coupling unit 16, such as for example a claw coupling or a synchroniser, may be used for connecting the propulsion unit P to the transmission T. The actuating unit 2 is arranged to move the position of the coupling unit 16 between the engagement position $P_E$, where the propulsion unit P is in driving engagement with the transmission T, and a disengagement position $P_D$, where the propulsion unit P is disconnected from the transmission T. The disengagement position $P_D$ is schematically illustrated in FIG. 1B. The clutch unit 4 is disconnecting the actuating unit 2 from the electric motor 3 in the engagement mode $M_E$, and in the engagement mode $M_E$, the rotational movement of the drive shaft 5 is therefore prevented from being further transferred to the actuating unit 2. The electric motor 3 is configured for driving the oil pump unit 6 in the engagement mode $M_E$, and in the engagement mode $M_E$, the electric motor 3 can be used for only driving the oil pump 6, since the actuating unit 2 is disconnected from the drive shaft 5. It should further be understood that valves or other components may be connected to the oil pump unit 6 for regulating the flow of oil out from and into the oil pump unit 6.

As illustrated in FIGS. 1A-1B and 2, the actuating unit 2 comprises an actuating mechanism 14 and a shifting unit 15. The shifting unit 15 is connected to the coupling unit 16 with suitable connection means, and the shifting unit 15 is being displaced together with the coupling unit 16 between the engagement position $P_E$ and the disengagement position $P_D$ upon activation from the actuating mechanism 14. The actuating mechanism 14 is configured for displacing the shifting unit 15 between the engagement position $P_E$ and the disengagement position $P_D$. The actuating unit 2 is in the engagement mode $M_E$ configured for positioning the shifting unit 15 in the engagement position $P_E$, as shown in FIG. 1A. The actuating unit 2 is in the disengagement mode $M_D$ configured for positioning the shifting unit 15 in the disengagement position $P_D$, as shown in FIG. 1B.

The shifting unit 15 may for example comprise a shifting fork connected to a groove in the coupling unit 16, and the shifting fork is thus through the connection to the coupling unit 16 configured for connecting the propulsion unit P to the transmission T in the engagement mode $M_E$ and disconnecting the propulsion unit P from the transmission T in the disengagement mode $M_D$.

In the illustrated embodiment, the actuating unit 2 is arranged as a conventional ballscrew unit. The actuating mechanism 14 is arranged as a ballscrew, and the shifting unit 15 is arranged as a ballscrew nut. The ballscrew is drivingly connected to the electric motor 3 via the drive shaft 5 and the clutch unit 4, and the ballscrew is configured for displacing the ballscrew nut between the engagement position PE and the disengagement position $P_D$. When rotating the ballscrew with the electric motor 3 in a first rotational direction, the nut can be displaced axially along the ballscrew from the engagement position $P_E$ to the disengagement position $P_D$. When rotating the ballscrew with the electric motor 3 in a second rotational direction opposite the first rotational direction, the nut can be displaced axially along the ballscrew from the disengagement position $P_D$ to the engagement position $P_E$. It should be understood that other types of rotating actuators may be used instead of the described conventional ballscrew unit.

In the embodiment illustrated in FIG. 1A-1B, the propulsion unit P is arranged with a gear drive shaft 18, and a first gear wheel G1 is attached to the gear drive shaft 18. The coupling unit 16 is slidingly connected and non-rotatably connected to an intermediate drive shaft 19 via, for example, a spline connection or similar arrangement, where the coupling unit 16 can slide between the engagement position $P_E$ shown in FIG. 1A and the disengagement position $P_D$ shown in FIG. 1B in the axial direction of the intermediate drive shaft 19. The actuating unit 2 is used for positioning the coupling unit 16 in the different positions. A second gear wheel G2 is rotatably arranged on the intermediate drive shaft 19 via a bearing 17, and the second gear wheel G2 is in driving engagement with the first gear wheel G1. In the engagement position $P_E$, the coupling unit 16 is engaging the second gear wheel G2 and a rotational movement of the gear drive shaft 18 can be transferred to the intermediate drive shaft 19 via the first gear wheel G1, the second gear wheel G2, and the coupling unit 16. In the engagement position $P_E$, the second gear wheel G2 is prevented from rotating in relation to the intermediate drive shaft 19 through the engagement with the coupling unit 16, and a rotational movement of the second gear wheel G2 is transferred to the intermediate drive shaft 19. In the disengagement position $P_D$, the coupling unit 16 is disengaged from the second gear wheel G2 and a rotational movement of the gear drive shaft 18 is prevented from being transferred to the intermediate drive shaft 19 via the first gear wheel G1 and the second gear wheel G2. In the disengagement position $P_D$, the second gear wheel G2 is allowed to rotate in relation to the intermediate drive shaft 19, since the coupling unit 16 is disconnected from the second gear wheel G2. A rotational movement from the first gear wheel G1 may be transferred to the second gear wheel G2, but the rotational movement of the second gear wheel G2 is prevented from being further transferred to the intermediate drive shaft 19, since the second gear wheel G2 is connected to the intermediate drive shaft 19 via the bearing 17. The bearing 17 may be of any suitable construction providing low friction between the second gear wheel G2 and the intermediate drive shaft 19. The intermediate drive shaft 19 is further arranged with a third gear wheel G3, and in the engagement position $P_E$, the rotational movement of the intermediate drive shaft 19 can be transferred from the third gear wheel G3 to a fourth gear wheel G4 arranged on the transmission T. It should be understood that the drive shafts, the coupling unit and arrangement of gear wheels could have other configurations than the one illustrated in the embodiment shown in FIGS. 1A-1B. The transmission T may be of any suitable type depending on the vehicle construction, such for example a gear transmission connected to a differential unit, or simply only a differential unit.

In the illustrated embodiment shown in FIG. 3, the clutch unit 4 comprises an input section 9 and an output section 10. The input section 9 is connected to the drive shaft 5 of the electric motor 3 and the output section 10 is connected to the actuating unit 2. The input section 9 is configured for being connected to the output section 10 when displacing the actuating unit 2 from the engagement mode $M_E$ to the disengagement mode $M_D$, and when displacing the actuating unit 2 from the disengagement mode $M_D$ to the engagement mode $M_E$. When the actuating unit 2 is displaced between the engagement mode $M_E$ and the disengagement mode $M_D$, the rotational movement of the drive shaft 5 is transferred to the actuating unit 2 via the coupling unit 4, and the input section 9 and the output section 10 of the coupling unit 4 are connected to each other for transferring the rotational movement. The input section 9 is further configured for being disconnected from the output section 10 in the engagement mode $M_E$. When the actuating unit 2 is arranged in the engagement mode $M_E$, the rotational movement from the drive shaft 5 is prevented from being transferred to the actuating unit 2 due to the disconnection between the input section 9 and the output section 10. When disconnected, the input section 9 and the output section 10 are allowed to rotate in relation to each other.

The clutch unit 4 further comprises a locking mechanism 11, as schematically illustrated in FIG. 3. The locking mechanism 11 is configured for connecting the input section 9 to the output section 10, and for disconnecting the input section 9 from the output section 10. When the actuating unit 2 is exerting a rotational force on the output section 10 equal to or less than a predetermined force level value $V_{FL}$ during displacement of the actuating unit 2 between the engagement mode $M_E$ and the disengagement mode $M_D$, the locking mechanism 11 is connecting the input section 9 to the output section 10. This is the case during normal operation when shifting between the operational modes. When the actuating unit 2 is displacing the coupling unit 16 between the engagement position $P_E$ and the disengagement position $P_D$, the rotational force exerted on the output section 10 from the actuating unit 2 is equal to or less than the predetermined force level value $V_{FL}$. The predetermined force level value $V_{FL}$ may vary depending on for example the construction of the actuating unit 2 and the coupling unit 16, and the clutch unit 4 should therefore be calibrated in relation to the used actuating unit 2 and coupling unit 16. When the actuating unit 2 is exerting a rotational force on the output section 10 greater than the predetermined force level value $V_{FL}$ the locking mechanism 11 is disconnecting the input section 9 from the output section 10. This should be the case when the actuating unit 2 is arranged in the engagement mode $M_E$. Therefore, the system should have a configuration where the rotational force on the output section 10 is greater than the predetermined force level value $V_{FL}$ in the engagement mode $M_E$.

The system may for example be designed in a way where the shifting unit 15 in the engagement mode $M_E$ is reaching an end position. The end position may for example be where the coupling unit 16 is in engagement with the second gear wheel G2. In the end position, the rotational force exerted on the output section 10 of the clutch unit 4 from the actuating unit 2 is much higher than during displacement of the shifting unit 15. When the ballscrew nut together with the coupling unit 16 reaches the engagement position $P_E$, the ballscrew nut is prevented from further movement through the engagement between the coupling unit 16 and the second gear wheel G2. Since the ballscrew is drivingly connected to the electric motor 3, the rotational force on the output section 10 from the ballscrew will increase. When the increasing rotational force on the output section 10 is greater than the predetermined force level value $V_{FL}$, the output section 10 is disconnected from the input section 9, and the rotational movement of the drive shaft 5 is no longer transferred to the ballscrew.

The locking mechanism 11 may be arranged as a conventional detent locking mechanism known in the art, where the detent locking mechanism for example comprises a spring 12 and a detent device 13 connected to the spring 12, as schematically indicated in FIG. 3. The detent device 13 and the spring 12 may for example be arranged in connection to the input section 9, and the detent device 13 may engage a recess or similar structure arranged in the output section 10. When the detent device 13 is engaging the recess, the input section 9 is connected to the output section 10, wherein a rotational movement in a first rotational direction can be transferred from the input section 9 to the output section 10. When the detent device 13 is engaging the recess, the ballscrew can displace the ballscrew nut and the coupling unit 16 in a direction towards the second gear wheel G2. If a rotational force greater than the predetermined force level value $V_{FL}$ is exerted on the output section 10 the detent device 13 is being disconnected from the recess, and the input section is therefore disconnected from the output section 10, wherein the rotational movement of the input section 9 in the first rotational direction is prevented from being transferred to the output section 10. The configuration of the spring 12 is used for determining the force level where the detent device 13 is being disconnected from the recess. When the detent device 13 is disconnected from the recess, the input section 9 is allowed to rotate in relation to the output section 10, and the output section 10 is non-rotating. The locking mechanism 11 is further configured to connect the detent device 13 and the recess when the input section 9 is rotated with the electric motor 3 in a second rotational direction opposite the first rotational direction, and the ballscrew can then displace the ballscrew nut and the coupling unit 16 in a direction away from the second gear wheel G2.

When displacing the actuating unit 2 from the disengagement mode $M_D$ to the engagement mode $M_E$, the electric motor 3 is rotated in a first rotational direction and the rotational movement is transferred to the actuating mechanism 14. When the actuating unit has been displaced to the engagement mode $M_E$, the detent device 13 is disconnected from the recess, as described above, and the rotational movement of the electric motor 3 in the first rotational direction is no further transferred to the actuating mechanism 14. In the engagement mode $M_E$, the electric motor 3 is rotating the drive shaft 5 in the first rotational direction for driving the oil pump unit 6. When it is decided to change mode from the engagement mode $M_E$ back to the disengagement mode $M_D$, the electric motor 3 is rotated in a second rotational direction opposite the first rotational direction, and the detent device 13 is again connected to the recess. The actuating unit 2 can then be displaced to the disconnected mode $M_D$. In the disconnected mode $M_D$, a switch or similar arrangement may be used for shutting off the system if desired for preventing further movement of the actuating unit 2.

It should be understood that since the pump rotor 7 of the oil pump unit 6 is connected to the drive shaft 5, the pump rotor 7 is being rotated with the drive shaft 5 when the actuating unit 2 is being displaced between the engagement position $P_E$ and the disengagement position $P_D$. The system may be designed with a disconnecting function of the pump rotor 7 from the drive shaft 5, where a suitable disconnecting unit, such as for example a coupling unit, is preventing the pump rotor 7 from being rotated with the drive shaft 5 when the actuating unit 2 is displaced between the engagement position $P_E$ and the disengagement position $P_D$.

When operating the actuator system 1, the actuating unit 2 is connected to the electric motor 3 with the clutch unit 4 in the disengagement mode $M_D$ where the transmission T is disconnected from the propulsion unit P. The actuating unit 2 is thereafter displaced with the electric motor 3 from the disengagement mode $M_D$ to the engagement mode $M_E$ where the transmission T is connected to the propulsion unit P, during operation of the electric motor 3 in a first rotational direction. In the engagement mode $M_E$, the actuating unit 2 is disconnected from the electric motor 3 with the clutch unit 4, and the oil pump unit 6 is driven with the electric motor 3 during operation in the first rotational direction. In the engagement mode $M_E$, the actuating unit 2 is again connected to the electric motor 3, with the clutch unit 4, during operation of the electric motor in a second rotational direction opposite the first rotational direction. The actuating unit 2 is thereafter displaced with the electric motor 3 operating in the second rotational direction from the engagement mode $M_E$ to the disengagement mode $M_D$.

The system may be configured for disconnecting the actuating unit 2 from the electric motor 3 with the clutch unit 4 in the disengagement mode $M_D$ if desired with suitable disconnecting arrangements.

When operating the actuator system 1, the electric motor 3 is thus driven in a first rotational direction when displacing the actuating unit from the disengagement mode $M_D$ to the engagement mode $M_E$, and driven in the first rotational direction in the engagement mode $M_E$. The electric motor 3 is driven in a second rotational direction when displacing the actuating unit from the engagement mode $M_E$ to the disengagement mode $M_D$, where the second rotational direction is opposite the first rotational direction. The input section 9 of the clutch unit 4 is connected to the output section 10 when the actuating unit 2 is displaced from the disengagement mode $M_D$ to the engagement mode $M_E$, and the input section 9 is disconnected from the output section 10 in the engagement mode $M_E$. The input section 9 is connected to the output section 10 when displacing the actuating unit 2 from the engagement mode $M_E$ to the disengagement mode $M_D$. The input section 9 is connected to the output section 10 with the locking mechanism 11 when the actuating unit 2 is exerting a rotational force on the output section 10 equal to or less than the predetermined force level value $V_{FL}$ during displacement of the actuating unit 2 from the disengagement mode $M_D$ to the engagement mode $M_E$. The input section 9 is disconnected from the output section 10 with the locking mechanism 11 when the actuating unit 2 is exerting a rotational force on the output section 10 greater than the predetermined force level value $V_{FL}$ in the engagement mode $M_E$. The input section 9 is connected to the output section 10 with the locking mechanism 11 when the actuating unit 2 is exerting a rotational force on the output section 10 equal to or less than a predetermined force level value $V_{FL}$ during displacement of the actuating unit 2 from the engagement mode $M_E$ to the disengagement mode $M_D$.

When operating the actuator system 1, the shifting unit 15 is displaced with the actuating mechanism 14 from the disengagement position $P_D$ to the engagement position $P_E$ during displacement of the actuating unit 2 from the disengagement mode $M_D$ to the engagement mode $M_E$. The shifting unit 15 is displaced with the actuating mechanism 14 from the engagement position $P_E$ to the disengagement position $P_D$ during displacement of the actuating unit 2 from the engagement mode $M_E$ to the disengagement mode $M_D$.

The present disclosure has been presented above with reference to specific embodiments. However, other embodiments than the above described are possible and within the scope of the disclosure. Different method steps than those described above, performing the method by hardware or software, may be provided within the scope of the disclosure. Thus, according to an exemplary embodiment, there is provided a non-transitory computer-readable storage medium storing one or more programs configured to be executed by one or more processors of the actuator system 1, the one or more programs comprising instructions for performing the method according to any one of the above-discussed embodiments. Alternatively, according to another exemplary embodiment a cloud computing system can be configured to perform any of the method aspects presented herein. The cloud computing system may comprise distributed cloud computing resources that jointly perform the method aspects presented herein under control of one or more computer program products. Moreover, the processor may be connected to one or more communication interfaces and/or sensor interfaces for receiving and/transmitting data with external entities such as e.g. sensors arranged on the vehicle surface, an off-site server, or a cloud-based server.

The processors associated with the control unit of the actuator system 1 may include any number of hardware components for conducting data or signal processing or for executing computer code stored in memory. The system may have an associated memory, and the memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

REFERENCE SIGNS

1 Actuator system
2 Actuating unit
3 Electric motor
4 Clutch unit
5 Drive shaft
6 Oil pump unit
7 Pump rotor
8 Housing structure
8a Inlet opening
8b Outlet opening
9 Input section
10 Output section
11 Locking mechanism
12 Spring
13 Detent device
14 Actuating mechanism
15 Shifting unit
16 Coupling unit
17 Bearing
18 Gear drive shaft
19 Intermediate drive shaft
G1 First gear wheel
G2 Second gear wheel
G3 Third gear wheel
G4 Fourth gear wheel
T Transmission
P Propulsion unit

What is claimed is:

1. An actuator system for a vehicle transmission, wherein the system comprises an actuating unit and an electric motor drivingly connected to the actuating unit, wherein the actuating unit is configured for being displaced by the electric motor between an engagement mode where the transmission is connected to a propulsion unit and a disengagement mode where the transmission is disconnected from the propulsion unit;

wherein the system further comprises a clutch unit arranged between the actuating unit and the electric motor and connected to a drive shaft of the electric motor, wherein the clutch unit is configured for connecting the actuating unit to the electric motor when displacing the actuating unit between the engagement mode and the disengagement mode, and wherein the clutch unit is configured for disconnecting the actuating unit from the electric motor in the engagement mode;

wherein the system further comprises an oil pump unit drivingly connected to the electric motor, wherein the electric motor is configured for driving the oil pump unit at least in the engagement mode; and wherein the oil pump unit is arranged between the electric motor and the clutch unit, wherein the drive shaft of the electric motor is connected to a pump rotor of the oil pump unit.

2. The actuator system according to claim 1,
wherein the oil pump unit comprises a housing structure encompassing the pump rotor, wherein the housing structure is arranged in connection to the clutch unit.

3. A vehicle comprising an actuator system according to claim 1.

4. An actuator system for a vehicle transmission, wherein the system comprises an actuating unit and an electric motor drivingly connected to the actuating unit, wherein the actuating unit is configured for being displaced by the electric motor between an engagement mode where the transmission is connected to a propulsion unit and a disengagement mode where the transmission is disconnected from the propulsion unit;
wherein the system further comprises a clutch unit arranged between the actuating unit and the electric motor and connected to a drive shaft of the electric motor, wherein the clutch unit is configured for connecting the actuating unit to the electric motor when displacing the actuating unit between the engagement mode and the disengagement mode, and wherein the clutch unit is configured for disconnecting the actuating unit from the electric motor in the engagement mode;
wherein the system further comprises an oil pump unit drivingly connected to the electric motor, wherein the electric motor is configured for driving the oil pump unit at least in the engagement mode;
wherein the clutch unit comprises an input section and an output section, wherein the input section is connected to the drive shaft of the electric motor and the output section is connected to the actuating unit, wherein the input section is configured for being connected to the output section when displacing the actuating unit between the engagement mode and the disengagement mode, and wherein the input section is configured for being disconnected from the output section in the engagement mode;
wherein the clutch unit further comprises a locking mechanism;
wherein the locking mechanism is configured for connecting the input section to the output section when the actuating unit is exerting a rotational force equal to or less than a predetermined force level value during displacement of the actuating unit between the engagement mode and the disengagement mode on the output section; and wherein the locking mechanism is configured for disconnecting the input section from the output section when the actuating unit is exerting a rotational force greater than the predetermined force level value in the engagement mode on the output section; and
wherein the locking mechanism is a detent locking mechanism comprising a spring and a detent device connected to the spring.

5. An actuator system for a vehicle transmission, wherein the system comprises an actuating unit and an electric motor drivingly connected to the actuating unit, wherein the actuating unit is configured for being displaced by the electric motor between an engagement mode where the transmission is connected to a propulsion unit and a disengagement mode where the transmission is disconnected from the propulsion unit;
wherein the system further comprises a clutch unit arranged between the actuating unit and the electric motor and connected to a drive shaft of the electric motor, wherein the clutch unit is configured for connecting the actuating unit to the electric motor when displacing the actuating unit between the engagement mode and the disengagement mode, and wherein the clutch unit is configured for disconnecting the actuating unit from the electric motor in the engagement mode;
wherein the system further comprises an oil pump unit drivingly connected to the electric motor, wherein the electric motor is configured for driving the oil pump unit at least in the engagement mode;
wherein the actuating unit comprises an actuating mechanism and a shifting unit, wherein the actuating mechanism is configured for displacing the shifting unit between an engagement position and a disengagement position;
wherein the actuating unit in the engagement mode is configured for positioning the shifting unit in the engagement position, and wherein the actuating unit in the disengagement mode is configured for positioning the shifting unit in the disengagement position; and
wherein the actuating mechanism comprises a ballscrew, and the shifting unit comprises a ballscrew nut, wherein the ballscrew is drivingly connected to the electric motor, wherein the ballscrew is configured for displacing the ballscrew nut between the engagement position and the disengagement position.

6. The actuator system according to claim 5,
wherein the shifting unit comprises a shifting fork, wherein the shifting fork is configured for connecting the propulsion unit to the transmission in the engagement mode and disconnecting the propulsion unit from the transmission in the disengagement mode.

\* \* \* \* \*